June 11, 1929.　　G. W. STEDWELL　　1,717,274
DISPENSING OF LIQUIDS
Filed Dec. 8, 1928　　3 Sheets-Sheet 1
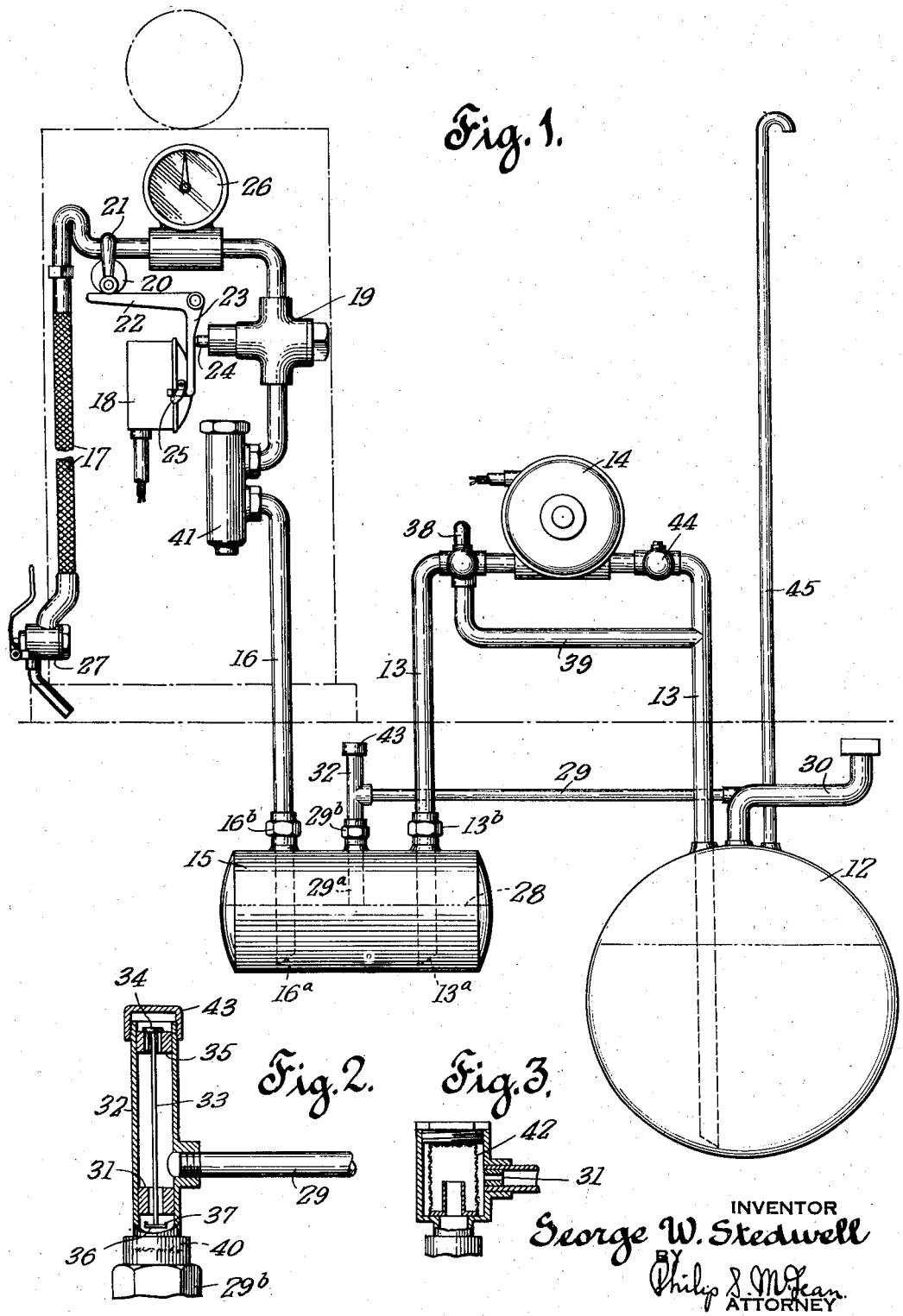
INVENTOR
George W. Stedwell
BY
Philip S. McLean
ATTORNEY June 11, 1929.  G. W. STEDWELL  1,717,274
DISPENSING OF LIQUIDS
Filed Dec. 8, 1928  3 Sheets-Sheet 2
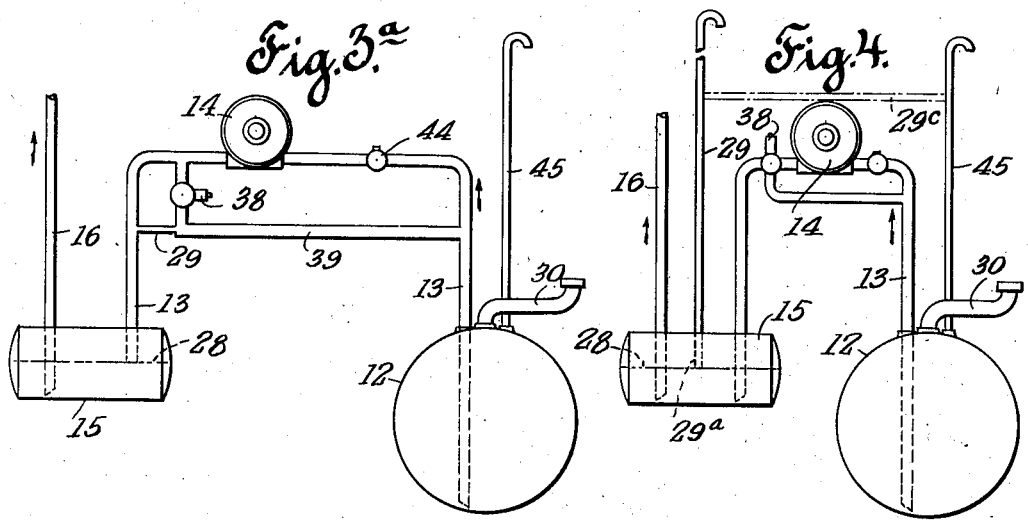
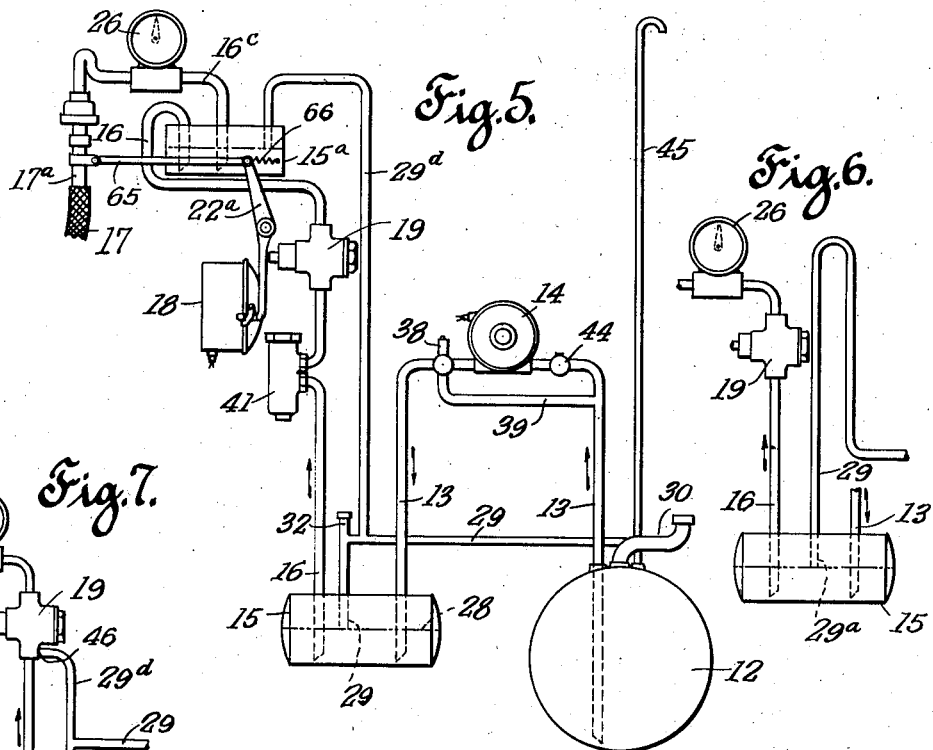
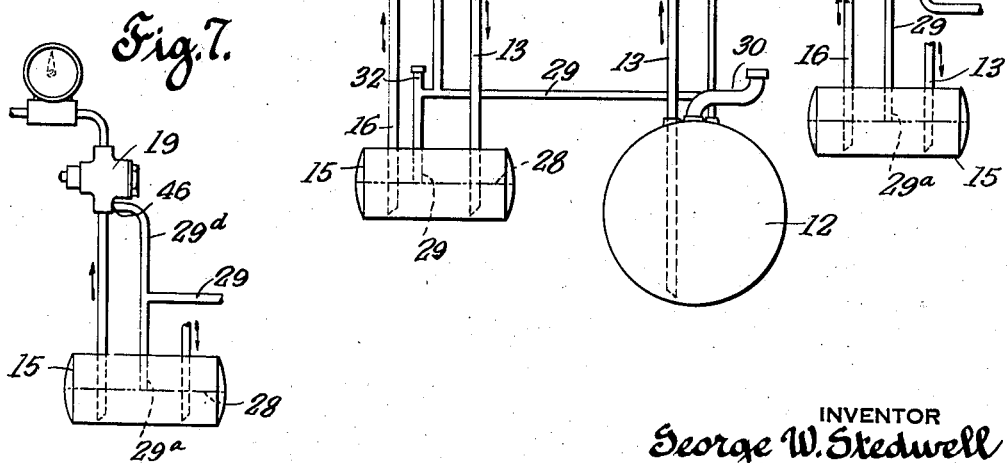
INVENTOR
George W. Stedwell
BY
Philip S. McGear
ATTORNEY June 11, 1929.  G. W. STEDWELL  1,717,274
DISPENSING OF LIQUIDS
Filed Dec. 8, 1928   3 Sheets-Sheet 3
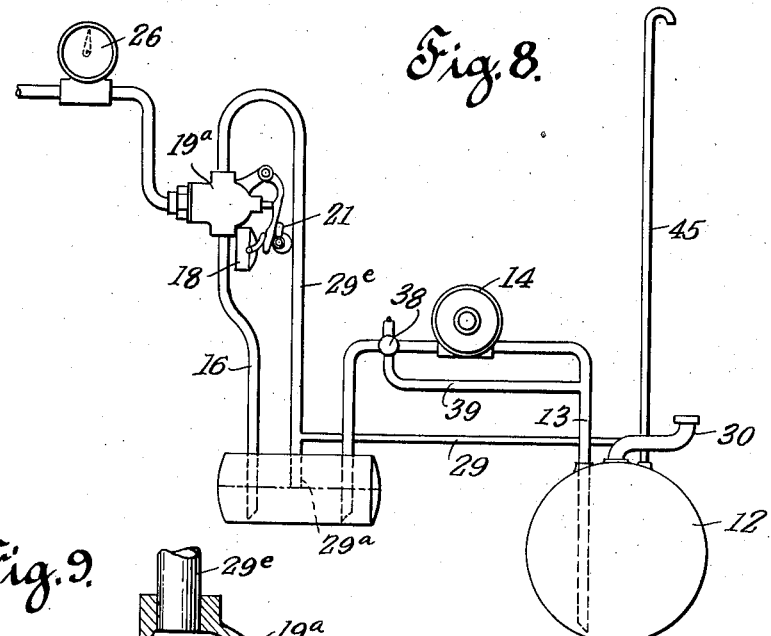
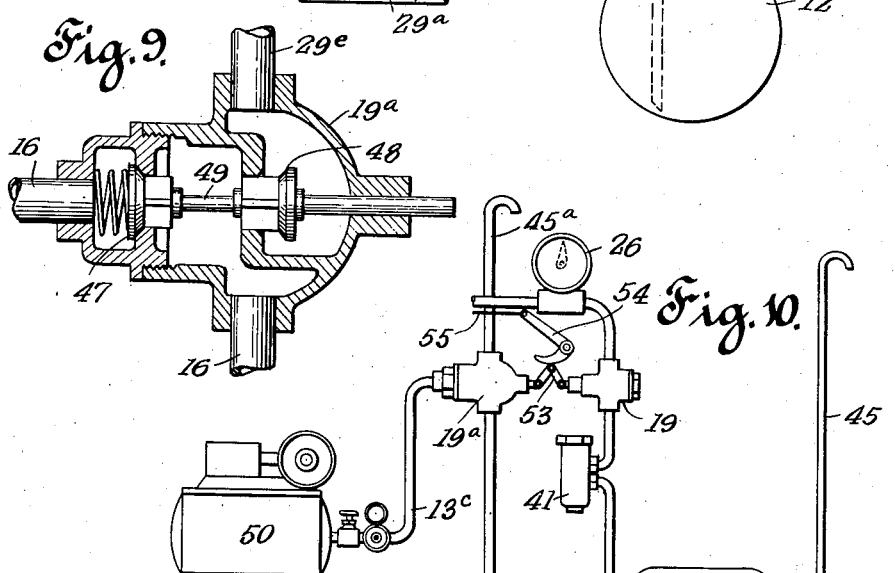
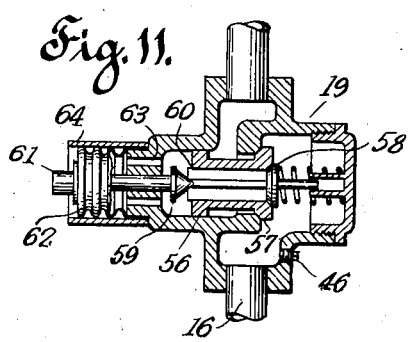
INVENTOR
George W. Stedwell
BY Philip S. McLean
ATTORNEY Patented June 11, 1929.

1,717,274

UNITED STATES PATENT OFFICE.

GEORGE W. STEDWELL, OF BROOKLYN, NEW YORK, ASSIGNOR OF ONE-HALF TO FRANCIS SHERIDAN, OF NEW YORK, N. Y.

DISPENSING OF LIQUIDS.

Application filed December 8, 1928. Serial No. 324,761.

This invention relates to the delivery or dispensing of liquids, particularly gasolene and the like.

Special objects of the invention are to enable rapid continuous delivery of liquid in any desired quantities, with simple reliable apparatus, to automatically relieve pressure on the apparatus and to take the air or gas out of the liquid, so that only liquid will be metered and delivered at the discharge end of the apparatus.

These objects are attained by various novel features of construction, combination and relations of parts, as set forth in the following specification.

In the drawings accompanying and forming part of the specification. Several preferred embodiments of the invention are illustrated, but as these are intended primarily for purposes of disclosure, it should be understood that the structure may be modified in various ways without departure from the true spirit and broad scope of the invention.

Fig. 1 is a broken and more or less diagrammatic view illustrating one simple form of the invention; Fig. 2 is a broken enlarged sectional view of the by-pass vent showing a form of automatic "tickler" for keeping the vent clear of obstructing matter; Fig. 3 is a broken sectional view illustrating a form of strainer combined with the by-pass vent; Fig. 3ª is a broken and somewhat diagrammatic view illustrating a modification in which the venting by-pass is extended back from the pressure tank to the liquid supply line, instead of back to the "fill" line as in the first form; Fig. 4 is a similar view showing the constant by-pass as a vent direct to atmosphere; Fig. 5 is an illustration of a form of the invention similar to Fig. 1 but with an extra pressure tank approximately at the level of the meter for keeping any air which might be trapped in the system out of the meter; Fig. 6 is an illustration of the modification of the first form showing the vent extended as an air trapping loop above the meter level; Fig. 7 is a view illustrating a double vented form of the apparatus; Fig. 8 is an illustration of a double vented form of the apparatus showing the second vent as a by-pass from a three-way valve in the delivery line; Fig. 9 is an enlarged detail sectional view of this combination three-way valve; Fig. 10 is an illustration of the invention as applied to an air pressure delivery system; Fig. 11 is a broken sectional detail view of the delivery valve.

In the first form of the invention shown, the liquid to be delivered is transferred from a storage tank 12 through piping 13 by an electrically operated pump 14 into a pressure or "delivery tank" 15 from whence delivery is made by piping 16, ending at the filling stand in a flexible delivery hose 17.

The control of the pump is effected by a switch 18 and this switch is shown as operated in conjunction with the valve 19 in the delivery line. The conjoint operation of valve and switch may be effected in various ways, but the same is here shown accomplished by a cam or eccentric 20, which can be turned by a handle 21 to deflect one arm 22 of a bell crank lever, whose other arm 23 engages the stem 24 of the delivery valve and has a hooked engagement with the operating lever 25 of the switch. A suitable meter is indicated at 26 and the hose is shown as provided with a suitable nozzle valve 27.

The transfer line 13 and the delivery line 16 both open into the lower portion of the pressure tank, so that a body of air will be trapped in the upper portion of this tank above the liquid level 28 therein to form a compressible cushion for exerting a steady delivery force on the liquid.

The action thus far described is the same as in Stedwell Patent 1,696,738 of Dec. 25, 1928, that is when the pump switch is closed and the delivery valve is opened, the pump, with the steadying aid of the air cushion in the pressure tank will deliver the liquid continuously and evenly through the delivery line, so long as the nozzle valve of the hose is open. In the patent referred to, the pressure in the delivery line is automatically released after each delivery of liquid by the operation of a special three-way valve interposed in the liquid delivery line. In the present invention, the pressure is automatically released by a continuously open vent interposed in the delivery side of the system.

In Fig. 1, the continuous vent is shown in the form of a by-pass line 29 extending from approximately the desired liquid level in the pressure tank back into the "fill" line 30 of the storage tank. This constant by-pass for the average gasolene dispensing system may be restricted to approximately $\frac{3}{16}$ of an inch and this restriction may be either in the pipe itself or be in the form of a partial closure in the pipe.

In the detail view, Fig. 2, the by-pass restriction is shown in the form of a reducing bushing 31 in the upright portion 32 of the by-pass and to insure the keeping of this restricted passage open at all times, a cleaning rod 33 is shown supported in the bushing by having a head 34 resting on the supporting bushing 35. Pressure against the underside of head 34 lifts this head and as the rod will drop back when pressure is absent, a vibration or agitation of the rod is produced, sufficient to keep the by-pass clear. A cross piece 36 is shown on the lower end of the rod to limit its up movement, said cross piece having pins or lugs 37 on its ends to prevent the same from seating against the end of the bushing and closing the pass to that extent.

In the delivery operation, the constant by-pass vents a certain amount of the pressure developed by the pump but as the vent is relatively small as compared with the volumetric capacity of the pump, this loss is not sufficient to materially detract from the pump operation. As soon as the pump stops however, the by-pass lowers the pressure almost immediately, releasing liquid from the pressure tank back to the storage tank until the air trapped in the top of the pressure tank lowers the liquid down to the mouth of the by-pass. When the liquid in the pressure tank uncovers the entrance to the by-pass as in Fig. 1, air or gas in the top of the tank can then escape through this open vent. Thus the effect of the constant by-pass is both to release pressure in the delivery side of the system and to restore the liquid in the pressure tank to the desired liquid level with the desired amount of air space above the same. The tickler in the by-pass insures the keeping of this pass clear and a pressure relief valve 38 at the delivery side of the pump in conjunction with a pump return line 39 protects the pump and the rest of the system from excessive pressure. This automatic pressure relief is of particular utility in conjunction with such a system as shown in Fig. 1, where the valve and switch are held in the operative condition by a cam or the like, said relief valve relieving any excess pressure which might be developed prior to opening the nozzle valve, the constant by-pass also aiding in this excess pressure relieving condition, which may exist between the time when the system is turned "on" and the time when liquid is actually being delivered.

A suitable screen may be interposed in the by-pass as indicated generally at 4 as in Fig. 2. A screen of the conventional "basket" type is indicated at 41 in the delivery line Fig. 1 and if desired, this same type of screen may be interposed in the by-pass.

In Fig. 3, a basket type screen is shown at 42 interposed in the vertical leg of the by-pass closely adjacent the restricting vent bushing 31 and intended to protect the latter sufficiently so as to require no cleaning rod such as shown in Fig. 2. It will be noted as to the latter construction that upon the removal of the cap 43 access may be had to the cleaning rod for manually actuating the same.

The pressure tank 15 may be of any desired size, a tank of ten gallons capacity being usually sufficient for serving from one up to four filling stands. This tank is shown as equipped ready for installation in the system by having extensions 13$^a$, 16$^a$ and 29$^a$ of the supply line, delivery line and vent line respectively, the first two open to the bottom portion of the tank and the last open to approximately the center or desired liquid level line of the tank and having external couplings or unions 13$^b$, 16$^b$ and 29$^b$ respectively, to receive the external pipe connections. The furnishing of this tank with a unit with the pipes entered or opening at the desired levels therein insures proper installation of the system and simplifies the work of setting up the apparatus.

The constant vent may, if desired, be combined with the supply and pressure relief lines, as indicated in Fig. 3$^a$. Here corresponding parts have been given the same numbers as in Fig. 1, the constant vent line 29 being shown simply as a relatively small pipe connected across between the liquid supply line 13 and the pressure returning line 39 at a point below the pressure relief line 38. To serve the liquid level determining purpose, the supply line 13 is shown as entered in the pressure tank only to the desired liquid level line at 28.

In this construction as in the first form, pressure will be automatically relieved by the constant by-pass when the pump stops and in this same operation the liquid in the pressure tank will be restored to the desired liquid level. In this instance, it will be noted that the by-pass pressure is released back into the liquid supply line 13 at a point below the pump inlet and behind the pump check valve 44. During operation of the pump therefore, the constant by-pass is relatively inefficient, because of the retarding influence of the flow created by the pump, but as soon as the pump stops, the constant by-pass immediately becomes more efficient as a vent to quickly release the pressure in the delivery side of the apparatus.

Fig. 4 illustrates how the constant vent may open direct to atmosphere or into the vent line 45 rising from the storage tank. The constant by-pass here designated 29 as before is simply shown as a stand pipe vent having a restriction in it or of the proper small size pipe rising from the liquid level line in the pressure tank up to a point above the highest liquid level in the system. The pressure in the delivery tank in this instance is not sufficient to force liquid up and out the constant vent, but air in excess of that required for the air cushion will automatically vent through this pipe when the pump action ceases. Instead of running a stand pipe up higher than the highest liquid level, the vent pipe 29 in this case may be connected by piping indicated at 29ᶜ with the regular storage tank vent pipe 45 at a point above the liquid levels at the pump and at the filling stand.

The system illustrated in Fig. 5 is generally similar to that shown in Fig. 1 with the addition of an extra pressure tank 15ᵃ located closely adjacent the meter and interposed in the delivery line 16, so as to receive liquid through the delivery line 16 from the first pressure tank and to pass the liquid along under pressure to the meter through a short delivery pipe extension 16ᶜ. This upper pressure tank also is shown as having a constant by-pass 29ᵈ coupled up with the constant by-pass of the lower pressure tank. This additional by-pass is shown as looped at the top to a height equal to or greater than the meter to provide a liquid column for balancing the column in the short delivery pipe extension 16ᶜ to thus insure against all possibility of air or gas being passed along to the meter.

The same idea of looping the constant by-pass to a height equal or higher than the meter or high point in the system is present in Fig. 6, which may be considered as illustrating a system similar to Fig. 1 with the by-pass carried up to a loop as high or higher than the meter, to allow for a column of liquid in the upright leg of the by-pass which will balance a column of liquid in the delivery pipe 16 to insure liquid, free of air, passing into the meter.

The construction shown in Fig. 7 is generally similar to the first disclosure, but like Fig. 5 has an extra or supplemental constant vent 29ᵈ, which however instead of being connected with an extra delivery tank as in Fig. 5, is directly connected with the inlet side of the delivery valve, as at the plugged inlet indicated at 46 in the detailed view of the valve, Fig. 11. An advantage of these double by-pass forms of the invention as illustrated in Figs. 5 and 7 is that a second constant by-pass is provided, which will answer the requirements of the system in case the other by-pass should for any unknown cause become clogged or stopped up.

The disclosure in Fig. 8 has the looped by-pass balanced column feature of Figs. 5 and 6 and the double by-pass feature of Fig. 7, the looped section 29ᵉ of the by-pass being connected in this instance into the top of a special three-way valve 19ᵃ, which as shown in Fig. 9 is interposed in the delivery line 16 and has a spring seated valve 47 controlling the delivery flow, with an extra valve 48 operating in opposition to the first and adapted when open, as illustrated, to vent the section of the delivery line 16 below it up through the loop 29ᵉ of the by-pass. The two valves are shown carried by the same valve stem 49, which when actuated by the handle 21 shuts off the valve end of the vent loop and opens up the delivery passage to the meter. When delivery is completed, the loop of the constant by-pass is again connected with the delivery line.

Fig. 10 illustrates an application of the invention to an air pressure delivery system in which the same type of three-way valve 19ᵃ can be employed for controlling admission of air from the compressed air tank 50 to the delivery tank 15 by way of piping 13ᶜ and the venting of the pressure tank by a stand pipe vent 45ᵃ after completion of each delivery. When the air pressure on the liquid in the pressure tank is thus relieved, that is when the valve 19ᵃ is in the position disclosed in Fig. 9 with pipe 13ᵃ in communication with pipe 45ᵃ, the liquid will flow by gravity from storage tank 12 through pipe 51 and check valve 52 into the pressure tank. The constant by-pass 29 in this case is shown as looped up above the level and entered into the top of the storage tank. The delivery valve 19 and the three-way valve 19ᵃ are shown in this instance, as both operated substantially simultaneously by toggle linkage 53 engaged by one arm of a bell crank 54, which is actuated by a pull connection 55.

While the structure of the delivery valve 19 may vary, a preferred embodiment of the same is illustrated in Fig. 11, which shows the same as having a sliding tubular valve body 56 controlling the through port 57 and having slidingly mounted in it a spring vented pilot valve 58, which latter is engaged and shifted from its seat by a valve 59 adapted, after it has unseated the pilot valve, to close against the end 60 of the tubular valve. The actuating valve 59 has a projecting operating stem 61 shown as seated to the valve casing by a collapsible corrugated diaphragm or sylphon 62. The interior of this sylphon is open to the inside of the valve casing by ports 63, so that the contained liquid may serve as a "liquid piston" aiding the opening movement of the main valve. The pilot valve first "cracks" and balances the pressure at opposite sides in the main valve, whereupon with the aid of the liquid piston, said main valve is readily shifted to fully open up the delivery line. To protect the sylphon from mechanical injury, the same may be loosely enclosed in a sleeve extension 64 of the casing.

In all forms of the invention, the pressure or delivery tank operates in conjunction with and largely because of the constantly open by-pass as a de-airing chamber for relieving the liquid as it enters said chamber of entrained air or gas, the released air or gas rising and combining with the air cushion in the top of the tank, leaving the liquid, freed of air to pass from the bottom portion of the tank out through the delivery line. The constant by-pass by the location of its entry in the pressure tank predetermines the amount of this air cushion and the amount of liquid that should remain in the pressure tank as a starting condition. The pressure tank may be and usually is supplied as a complete unit with the pipes or pipe connections for the supply, delivery and constant by-pass lines entered at the proper levels in the tank, so that said tank may be quickly and surely coupled in the delivery system in proper relation and this special unit may be mounted in the most convenient or desirable relation either near to the pump or storage tank end of the apparatus or nearer or actually directly on the filling stand, the latter situation being many times desirable because of the close proximity to the meter and the practical ability to keep out all air and insure only liquid passing to the meter.

The constant by-pass continually carries the gas back to the storage tank in the constructions such as shown in Figs. 1, 5 etc., which is an important feature in the handling of hazardous liquids.

Another special feature of the construction shown in Fig. 5 is that the lever 22$^a$ which operates the delivery valve and switch is controlled from the hose, which in this instance, is shown as having at its upper end a swivel or swing joint section 17$^a$, having enough movement to actuate the lever through the medium of a link 65 hooked about or otherwise connected to the swing joint section of the hose. This construction makes it possible to both operate the delivery valve and throw the motor switch by simply pulling on the hose. A returning spring may be employed as indicated at 66 or the weight of the hose in itself may be sufficient to restore the parts to normal, that is to permit the delivery valve to close and the pump switch to snap to the off position when pull on the hose is released after a delivery of the liquid.

The packless valve which is indicated at 19 in Fig. 1 and shown in detail in Fig. 11, in conjunction with the enclosed switch 18, together with the common actuating mechanism for both, constitutes a unit of particular value as the packless valve is sealed against possibility of leakage of inflammable gases and the switch is wholly enclosed. The valve and switch therefore can be put close together and this in turn enables a simple and compact form of common actuator to be employed for operating them both. In addition to obtaining a liquid piston effect, the ports about the valve stem permit free flow of liquid into and out of the sylphon preventing the sylphon from becoming "liquid locked", which would occur through slow leakage of liquid along the valve stem passage. Such leakage even though relatively slow, would in the course of time cause the sylphon to become completely filled with liquid, preventing any free sylphon action because of the small clearance of the valve stem in its guide passage. The short leg of the constant by-pass insures the desired liquid level in the pressure tank and the maintenance of a sufficient liquid seal for the liquid delivery pipe, which is thus kept constantly sealed against any entrance of air. The connection for the liquid delivery line can therefore be made in various ways, provided the entrance thereto be below the entrance to the constant by-pass.

In case the liquid in storage becomes so low that the pump draws air or air mixed with the liquid, the constant by-pass will take care of this situation by relieving the excess air from the top of the pressure tank as soon as the liquid has been lowered in the delivery operation to the level of the entrance to the by-pass. This same situation will exist with the air pressure feed system illustrated in Fig. 10, for then when there is no longer sufficient liquid in storage to fill the pressure tank enough to cover the entrance to the constant by-pass, the air will then vent through the constant by-pass and will not break through the seal in the liquid delivery line. Hence, in all cases, the air is kept out of the liquid delivery line and false reading of the meter is thereby prevented.

With this invention, a foot valve to hold the liquid column in the suction line of the pump is no longer necessary, because any air taken in the suction line simply escapes into the air cushion in the pressure tank, being automatically vented as required by the constant by-pass. The absence of the foot valve enables the constant by-pass being connected when desired back into the suction line of the pump, as indicated for instance, in Fig. 3$^a$.

While the invention is of great utility in the handling of all grades of gasolene, it is of particular importance in the handling of the so-called "high test" gasolenes, which because of their greater volatility have a greater tendency to entrain and hold air and gas generated or taken up by the splashing and agitation at the pump and other parts of the system. Such air or gas carried along by the liquid is released from the liquid, in the pressure tank, joining the air cushion and being vented as required by the constant by-pass, the liquid passed on through the delivery line being thus de-aired and freed from explosive vapors at the point of discharge. This eliminates the explosion hazard which is recognized as commonly existing adjacent the filling stands and in the neighborhood of automobile tanks receiving the liquid.

What is claimed is:

1. In liquid dispensing systems the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed.

2. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom, a constantly open vent for said pressure tank, said vent being continually open but of relatively small capacity as compared with the capacity of the delivery line, so as not to seriously impair the delivery action, but to be effective always to relieve pressure in the system when deliveries are completed, said constant by-pass extending at least as high as the liquid level in the system.

3. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed, said constant by-pass opening in the pressure tank at an intermediate level in the same.

4. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed, said constant by-pass having a restricted way and an agitating member loosely mounted in said way for keeping the same open.

5. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed, said constant by-pass having a flow restricting bushing of predetermined desired cross-sectional area.

6. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed, said constant by-pass having a connection back to the storage tank.

7. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed, said pressure tank being located at a high level point in the system and relatively close to the delivery end of the same.

8. In liquid dispensing systems, the combination of a storage tank, a pressure tank, means for effecting transfer of liquid from the storage tank to the pressure tank, a delivery line extending from the pressure tank and provided with means for controlling the delivery of liquid therefrom and a constantly open vent for said pressure tank, said vent being continually open but of relatively small capacity as compared with the capacity of the delivery line, so as not to seriously impair the delivery action, but to be effective always to relieve pressure in the system when deliveries are completed, said constant by-pass having an upwardly looped portion extending to approximately the high liquid level of the system.

9. In liquid dispensing systems, a pressure tank having supply and delivery lines entered therein at points near the bottom of the tank and a constantly open vent entered therein at a mid-level portion of the tank, a supply source connected with the supply line and discharge controlling means for the delivery line.

10. As a new article of manufacture, a tank unit for liquid dispensing systems, comprising a tank structure for holding liquid under pressure, said tank having an inlet and an outlet open to the bottom portion of the tank and a vent open to an intermediate level portion of the tank and said tank carrying coupling means by which external pipe connections may be directly made to said inlet, outlet and vent.

11. As a new article of manufacture, a pressure tank for liquid dispensing systems, comprising a tank for holding a volume of liquid under pressure, three pipes entered in the top of said tank and extending two of them to a point close to the bottom of the tank and the third to approximately the mid-level of the tank and couplings at the exposed ends of said pipes for enabling the connection of external piping with the definite tank levels provided by the pipes mounted in and carried by the tank.

12. In liquid dispensing systems, a liquid delivery valve for controlling flow through a delivery line, an enclosed electric switch for governing operation of an electric pump for supplying the delivery line and common means for actuating said valve and switch substantially in unison.

13. In liquid dispensing systems, a packless delivery valve, an enclosed electric switch closely associated therewith and common means for actuating both said valve and switch.

14. In liquid dispensing systems, a liquid delivery meter, an air trapping and cushioning pressure tank located adjacent said meter, means for delivering liquid into said tank, a short delivery connection extending from the lower portion of said pressure tank to the meter and venting means for relieving pressure in the tank after delivery of liquid is completed.

15. In liquid dispensing system, a liquid delivery meter, an air trapping and cushioning pressure tank, located adjacent said meter, means for delivering liquid into said tank, a short delivery connection extending from the lower portion of said pressure tank to the meter and a constantly open vent extending from the air trapping liquid level in said pressure tank.

In testimony whereof I affix my signature.

GEORGE W. STEDWELL.